May 21, 1957 C. S. NUNAN 2,793,319

ELECTRON LENS STRUCTURE FOR TELEVISION TUBES

Filed July 26, 1955 3 Sheets-Sheet 1

INVENTOR
CRAIG S. NUNAN
BY Lippincott & Smith
ATTORNEYS

May 21, 1957 C. S. NUNAN 2,793,319

ELECTRON LENS STRUCTURE FOR TELEVISION TUBES

Filed July 26, 1955 3 Sheets-Sheet 2

INVENTOR
CRAIG S. NUNAN
BY Lippincott & Smith
ATTORNEYS

ELECTRON LENS STRUCTURE FOR TELEVISION TUBES

Filed July 26, 1955 3 Sheets-Sheet 3

INVENTOR
CRAIG S. NUNAN
BY Lippincott + Smith
ATTORNEYS 2,793,319
Patented May 21, 1957

2,793,319

ELECTRON LENS STRUCTURE FOR TELEVISION TUBES

Craig S. Nunan, Berkeley, Calif., assignor to Chromatic Television Laboratories, Inc., New York, N. Y., a corporation of California Application July 26, 1955, Serial No. 524,515
6 Claims. (Cl. 315—21)

The invention relates to display tubes for reproducing television images in color and particularly to tubes utilizing the "post-deflection-focusing" principle, wherein the electron beam, after being deflected to scan the target area and the screen on which the picture is displayed, is converged or refocused to a cross-sectional area of diminished size, so that it impacts a phosphor which is emissive of a single primary of component color on the screen. In general the screen comprises a multiplicity of color cells disposed in a repeating pattern thereon, each cell including a number of different phosphors each emissive of a single one of the component colors employed and the dimension of each cell being of the order of magnitude of a single elemental area or picture point of the image to be reproduced.

Two general methods are employed for selecting the particular phosphor upon which the converging beam falls; in accordance with one of these methods the angle of incidence of the beam at the focusing structure determines the location of the focal point, three electron guns, at slightly different positions, originating the beams which fall on the different phosphors. The second method of color control comprises deflecting the beam slightly as it passes through the focusing structure to cause it to impact the phosphor desired.

Whichever method of color control is used the focusing is effected by a multiplicity of electron lenses, each one corresponding to an individual color cell with the aperture of each lens being approximately equal in dimension to the color cell to which it corresponds. In a preferred form of tube, in connection with which the present invention will particularly be described, the color cells are formed of strips of each of the phosphors used, the dimension of the cell transverse to the strips being of approximately the dimension of one picture point and the strips of individual phosphors occupying subareas of less than picture element width within the group forming the cell. In the other dimension the strips extend completely across the screen. Each of the electron lenses used with this type of screen is the analogue of a cylindrical lens, the aperture of each lens being the interspace between an adjacent pair of elongated linear conductors (which may be either wires or tapes) which extend, substantially parallel to the strips forming the color cell, in the form of a grid covering the entire area of the display screen as viewed from the source of the electron beam or beams. Where microdeflection at the lens structure is used to select the color displayed, the linear conductors defining the apertures of the electron lenses are divided into two interleaved and mutually insulated sets; a potential difference applied between the two sets will then deflect the electrons passing through the aperture to one side or the other, the spot falling on the third phosphor when no voltage is applied between the two sets of electrodes.

In order to establish the electron lenses, at least one additional electron-permeable electrode is necessary. In one form of lens, which has numerous practical advantages, this last-mentioned electrode comprises a conducting film or layer, overlying the phosphors of the screen, which is operated at a potential strongly positive to the aperture-forming electrode or "color-grid," the voltage between the color-grid and the film being from two and a half to three times that between the electron source and the color-grid.

In spite of its simplicity this type of lens structure has several disadvantages. The focal lengths of the elementary electrical lenses depend primarily on two factors; the spacing between the color-grid and the conducting film on the display screen and the component, normal to the color grid and screen surfaces, of the relative velocities imparted to the electrons of the scanning beam by the voltage drops between the electron emitting cathode tube and the grid $V_1$ and that between the grid and the film $V_2$. If the ratio between these velocities is $$\frac{V_2}{V_1}=\frac{\cos^2\psi}{\cos^2\beta}(1+2\cos\beta)$$

where $\psi$ is the angle of deflection of the beam and $\beta$ is the component of $\psi$ normal to the grid conductors, the electrons will be brought to a focus on the screen surface. Because of the scanning deflection, however, the angle of incidence of the beam is constantly changing and therefore, with the grid and the film at fixed potentials, the ratios and hence the focus vary over the screen surface. A compromise focusing voltage is therefore ordinarily chosen, with the result that the beam is somewhat underfocused at the center of the screen and overfocused at the edges. The same factors that affect focusing also affect the sensitivity of the beam to the microdeflection at the grid which controls the color, this microdeflection increasing with the scanning angle. Of these two effects, however, the change in effective focal lengths and spot size is the more important, since deflection sensitivity can be compensated for by varying the width of the phosphor strips.

A further disadvantage of the type of lens mentioned results from the field between the color-grid and the screen and its effect on stray electrons from various sources, attracting them to the screen at points other than the initial point of impact of the beam, which results in raising the over-all background level of illumination of the latter and in color dilution. Of the electrons so reaching the screen there are several sources; the most important of these are secondary emission from the conductors of the grid and widely scattered or "reflected primary" electrons emerging from the screen itself with sufficient energy and at such angles that they are returned to the screen by the field to cause the undesired illumination. In addition there will be some similarly but less widely scattered electrons, scattered by the grid conductors.

In order to prevent as many of these stray electrons as possible from reaching the screen it has been found that it is advantageous to operate the shell of the tube, if it be of metal, or of the conducting coating normally applied to its inner surface if the tube be of glass, at a potential somewhat positive to the color-grid. Secondary electrons from the color-grid are then attracted to the walls of the tube and therefore do not reach the screen to cause increase of background level or color dilution. This latter expedient, however, results in further difficulties. The field between the color-grid and the tube wall is not uniform, nor are the lines of force constituting it normal to the screen surface. At the edges of the screen the field is most concentrated; it is in a direction which tends to add to the scanning deflection of the beam and, further, it adds to the focusing effect of the field between the screen and the color-grid, resulting in still further overfocusing of the beam in this locality.

The broad purpose of the present invention is to provide a lens structure which will overcome these difficulties but still retain the advantages of post deflection acceleration, with the conservation of deflecting power which this entails, while maintaining screen brightness. Contributory to this broad purpose, among the objects of the invention are to provide a lens structure which will minimize the differences in sensitivity to focusing and deflection over the screen surface; to provide a lens structure which will reduce color dilution and undesired increase in background level or illumination by preventing both secondary electrons emitted from the grid wires reaching the screen and by collecting highly scattered or reflected primaries from the screen returning thereto; and to provide a lens structure which permits control of the field at the edges of the screen so as to prevent distortion of the television raster in these localities. A further object is to provide a structure which does not result in disfigurement of the image by shadows of the structure itself appearing on the image displayed, cause over-focussing at the screen edges, or otherwise deteriorate the image.

In broadest terms the present invention comprises, in addition to the color-grid and the conductive coating on the screen which have already been described, means for establishing a region of decelerating field between the electron gun and the color-grid and adjacent to the latter, this field being confined to a region closely adjacent to the color-grid, and of decreasing strength from the center of the target area outwardly toward the edges. In order to provide a region of this character an additional grid-like electrode structure is provided on the side of the color-grid remote from the display screen, with electrodes so arranged that the field is controlled in the manner mentioned. This can be done in several ways; the conductors of the auxiliary structure can, for example, be more widely spaced at the edges than at the center of the field, the size of the grid conductors can be reduced, or both, resulting in a lower capacity and hence fewer lines of force in this area. These expedients have only relatively minor effects, however, and preferably the spacing between the color-grid and the auxiliary structure is varied from the center outward, by disposing the conductors of one or both of the two grids in curved surfaces; in certain circumstances, as will be described hereinafter, the surface of the screen itself may also be curved. Where a strip-type screen is employed such as has been described, either or both the grids are disposed so that the conductors thereof lie in cylindrical surfaces, with the conductors of the auxiliary grid in planes substantially normal to those of the color-grid.

Both the structure thus briefly described and its advantages will be better understood from the detailed description of certain preferred embodiments which follow, taken in conjunction with the accompanying drawings wherein.

Figure 4A:
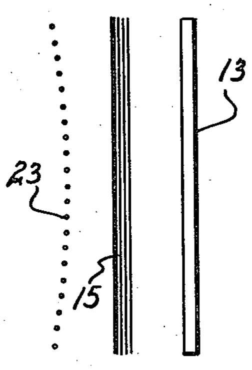
Figure 4B:
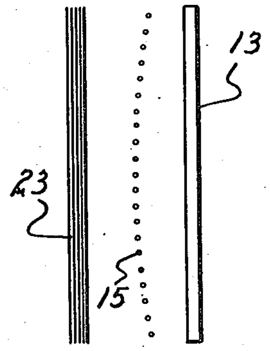
Figure 5:
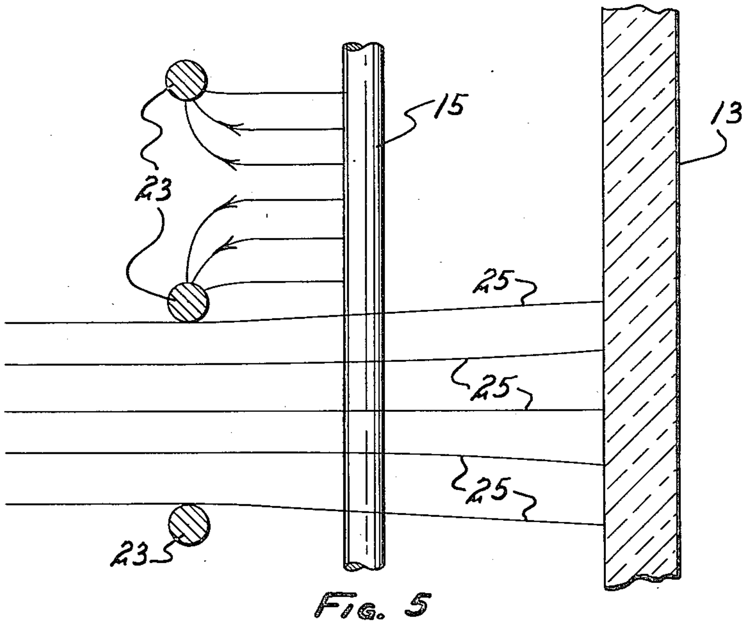
Figure 6:
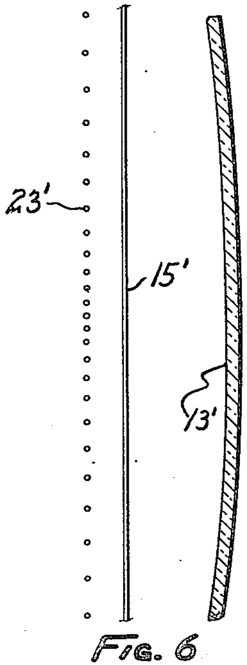

Fig. 4*a* is a diagrammatic representation of the relative positions of the phosphor screen, the color-grid and the auxiliary grid, the direction of view being normal to the conductors of the color-grid and parallel to the conductors of the auxiliary grid;

Fig. 4*b* is a similar diagram, the direction of view in this case being parallel to the color-grid conductors and normal to those of the auxiliary grid;

Fig. 5 is a fragmentary view illustrating the relative position of the conductors of the two grids and showing the direction of the lines of force between them and their resultant effect upon the electron beam; and Fig. 6 illustrates diagrammatically a form of the invention utilizing two planar grids and a curved screen, the varying decelerating field being provided by variation in the spacing of the wires of the auxiliary grid instead of by varying the spacing from the color-grid.

Figure 1:
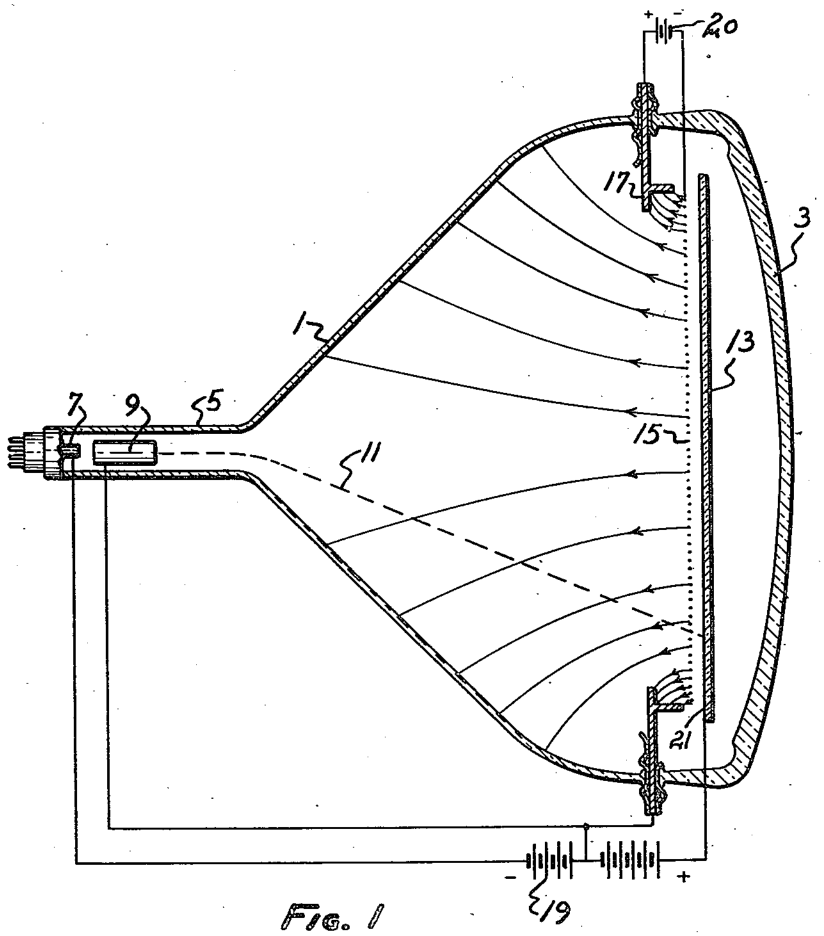
Fig. 1 is a cross-sectional diagram through a color television display tube constructed in accordance with past practice, showing the direction of the lines of force of the field between the color-grid and the tube envelope.

Considering first Fig. 1, the drawing shows, in diagrammatic form, the various elements of a tube of the general character here described as constructed in accordance with past practice. The tube comprises the usual funnel-shaped envelope 1, of metal or glass, having a transparent window 3 at its larger end and a neck 5 at the opposite end. Within the neck is an electron gun, the important elements whereof for the purpose of the present explanation are an electron-emitting cathode 7, and a final anode 9 for developing an electron beam (illustrated by the dash line 11), which is scanned over the target area within the window 3 in the operation of the tube. Within the target area is positioned a display screen 13, which comprises the usual transparent base with its phosphor and conductive coatings as have already been described. The base is supported closely adjacent to a color-grid 15 of closely adjacent parallel wires. Both the display screen 13 and the color-grid 15 are maintained accurately in their proper relative positions by a structure which is not shown, but is supported from a conducting frame 17 which is sealed through the wall of the tube at the junction between the conical shell and the window 3. This supporting structure is omitted for clarity, since various suitable arrangements have been described in the past and are now well known.

Through a suitable source (or sources) of potential, symbolically illustrated by the battery 19, proper relative potentials are applied to the various electrodes of the structure. The final anode 9 of the electron gun and the shell 1 or its conductive internal coating are operated at about five to five-and-a-half kilovolts positive to the cathode, and the grid 15 from 200 to 400 volts negative to the shell of the tube, the source 20 of this potential being indicated separately for convenience in certain explanations which follow. The conductive coating 21 of the screen 13 is maintained about 13 kv. positive to the color-grid 15.

The primary purpose of this diagram is to illustrate the general direction of the lines of force of the so-called "seeker" field between the color-grid, its supporting structure and the shell of the tube. The arrows on these lines indicate the direction of the forces effective upon the electron beams due to this field. It will be evident by inspection that in general the field is not parallel to the tube axis and that in addition to its component parallel to the axis it possesses an outwardly directed component which increases with increased distance from the center of the screen and deflection of the beam. Furthermore, it will be seen that at the extreme edges of the field there is a region in which it is highly concentrated and in which its outwardly directed component is at a maximum.

Figure 2:
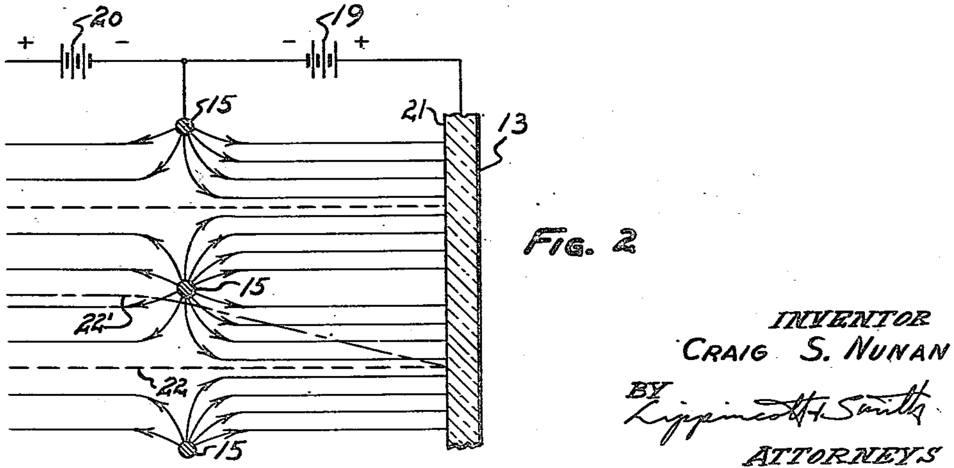
Fig. 2 is a fragmentary diagram showing the general form of the field between the color-grid and the screen in a tube of the type illustrated in Fig. 1.

Fig. 2 is a detail diagram of a small portion of the display screen 13 at the grid conductors 15, illustrating the detailed field directions, including both the "PDF" or post-deflection-focusing field and the seeker field as they concentrate on the wires of the color-grid. Again the arrows on the lines indicating the fields show the direction of the forces active upon electrons passing through them. As will be seen, an electron passing midway between the conductors 15, along the dotted line 22, will cut no lines of force of either field; it will be subject to a negative acceleration by the seeker field between the final anode 9, and the color-grid and to a positive acceleration between the color-grid and the screen. An electron passing through the color-grid at grazing incidence to the grid conductor, as, for example, along the path illustrated by the dot-dash line 22', will receive an acceleration toward the center of the aperture between the conductors due to the components of both the seeker field and the PDF field, the components of both of these fields which are generally parallel to the grid operating to deflect the electrons in the same direction. Since the focusing effects of these fields are additive it will be obvious that where the seeker field is at its strongest, at the edges of the target area as illustrated in Fig. 1, its effect is to produce an overfocusing, causing the electron beam to converge to its minimum size before it reaches the screen and then diverge to cause an increased size of spot. The total velocity of the beam where it penetrates the color-grid is a constant and is proportional to the square root of the voltage through which it has fallen. It will therefore be seen that at the edges of the screen, where its component of velocity in the direction parallel to the grid is greatest and the component normal to the screen is correspondingly low, the parallel component of velocity imparted by the focusing field will have maximum time to take effect and there is therefore already a tendency to overfocus. The additive effect of the seeker field therefore accentuates a tendency already established and makes it difficult to get even a reasonably good focus at this point if the average focus, throughout the screen as a whole, is to be maintained at its optimum value.

Figure 3:
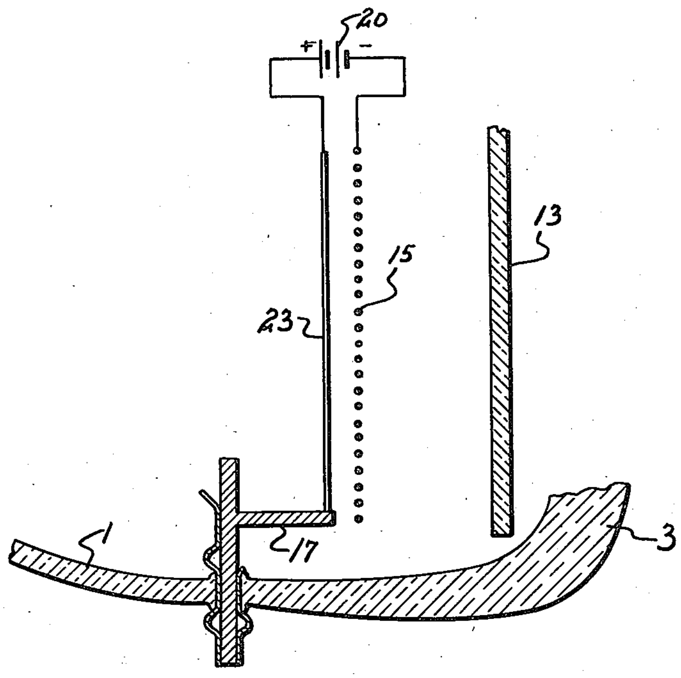
Fig. 3 is a fragmentary cross-sectional view of a tube in accordance with the present invention, showing the relative positions of the phosphor screen, the color-grid, and the auxiliary grid, the plane of section of the diagram being axially of the tube and normal to the conductors of the color-grid.

One general arrangement by which the situation above discussed is corrected is indicated in the fragmentary sectional diagram of Fig. 3, wherein the parts shown in Figs. 1 and 2 carry the same reference characters. In addition to the parts there shown, however, there is provided the auxiliary or seeker-grid comprising the elongated linear conductors 23 stretched across the supporting frame 17 at right angles to the color-grid conductors 15. In this diagrammatic view only a single one of these conductors is shown, the various arrangements in which they can be disposed being illustrated by later figures.

A preferred arrangement is shown in the exaggerated diagrams, Figs. 4*a* and 4*b*, the former diagram illustrating the arrangement looking along the conductors 23 of the seeker-grid while the latter figure is taken with the direction of view along the conductors of the color-grid.

In these figures it will be seen that both grids are disposed in cylindrical surfaces, convex toward each other. As shown in Fig. 3, the seeker-grid 23 is operated a few hundred volts positive to the color-grid 15, so that a decelerating field exists between the two grids. Due to the curvature of both, the field intensity decreases from the axis of the tube outward toward all edges of the screen. There is no concentration of the field at the edges, due to its distribution by the transverse wires of the seeker-grid. Considering any elementary lens of the structure, as defined by the conductors of the color-grid 15, the seeker-grid field adds, as before, to the focusing effect of the electron lenses, but the field strength in the decelerating region is greater at the center than at the edges, thus adding greater focusing effect at the center, where that between the color-grid and screen is weakest, and less at the edges where it is strongest. Furthermore, due to the shape of the fields, they have a small inwardly directed component which increases toward the edges instead of decreasing, thus tending to correct the barrel distortion of the field, slight though this distortion is.

Since the conductors of the color-grid 15 act as the apertures of cylindrical lenses, so, of course, do the apertures between the conductors of the seeker-grid 23. The shape of the fields formed at the latter grid, however, is such that the lenses defined thereby are negative or diverging lenses instead of converging lenses and the spacing of the electrodes 21 is preferably so adjusted that the beam is spread, in the plane of the screen, to prevent the formation of any shadows of the seeker-grid wires. This is possible because neither grid has any tendency to deflect the electrons in the direction parallel to the grid conductors, each grid acting as though it were completely separate so far as this direction of deflection is concerned.

The shape of the seeker field is illustrated in Fig. 5, where it will be seen that the lines of force, as they terminate on the seeker-grid wires, are in a direction away from the center of the apertures formed between these wires. Ideally, the beam paths are diverged as shown by the lines 25 of Fig. 5 so that the area of the impact of those electrons entering between an adjacent pair of wires is spread just sufficiently to cause the marginal electrons to fall immediately under the center of the wires.

The control of the strength of the decelerating field and the consequent greater uniformity of the size of the focusing spot by curving both grids as shown in Figs. 4*a* and 4*b* serves also to correct in part, although not entirely, the difference in sensitivity to deflection over the screen area. Transversely of the wires 15 the deflection sensitivity is greatest at the edges of the field. With this construction the distance between color-grid, where this deflection takes place, and the screen, is least where the angular sensitivity is greatest so that in this dimension the uniformity of sensitivity is improved. The arrangement, however, does not improve the uniformity considered in the direction longitudinal with respect to the conductors 15.

This latter correction can be made as is indicated schematically in Fig. 6. In this figure there is also shown an alternative method of varying the field strength from the center of the seeker-grid outwardly, without disposing the latter grid in a curved surface. The diagram is necessarily on a greatly exaggerated scale, but it will be seen that the wires 23' of the seeker-grid are spaced more closely together at the center of the screen than they are at the edges, resulting in a higher capacity and more lines in the central area than at the edges of the field. In this case the grid 15 may be either planar, as illustrated, or it may be convex toward the seeker-grid as shown in Figs. 4*a* and 4*b*. Correction for variation in sensitivity to deflection is provided by curving the screen 13' so that it approaches the color-grid 15' more closely at the ends of these conductors than it does in their central portion. Like the form of the invention illustrated in Figs. 4*a* and 4*b*, the field between the color-grid and the screen increases in intensity from the center of the screen outward toward the edges whereas the field between the color-grid and the seeker-grid decreases in intensity from the center outward.

The effectiveness of this latter arrangement on the inherent over-focusing at the edges of the field depends on close spacing between the two grids, and it will not usually be sufficient to give complete correction of inherent over-focusing in tubes operative with wide angles of deflection although it will prevent additional overfocusing due to the seeker field. Although less effective than the preferred construction it is shown for the sake of completeness of disclosure.

It should be obvious that the expedients used to vary the intensity of these fields across the target area can be combined in a number of permutations. The seeker field may be varied by varying the spacing of the conductors, by varying their size, by curving the surface in which the conductors lie, or by a combination of these constructions. The color-grid may be curved and the seeker grid flat, or both grids may be curved and the screen itself may be flat or curved in one or both dimensions.

Because of the various ways in which the field strength may be adjusted to meet the requirements it appears unnecessary to give specific formulas for curvature, spacing, etc., since these will vary with every tube and with the methods used to accomplish the desired result. The general nature of the equations involved are available in published works on electron optics and are generally known to those skilled in the art. In this connection, however, it may be noted that the curvatures shown in the diagrams are greatly exaggerated and that locally the errors involved are negligible if the surfaces are considered to be parallel planes, provided that due correction is made for the actual angles of incidence of the beam at curved surfaces.

It may also be noted that structurally the individual lenses in any elementary area of the target bear very considerable resemblance to lens structures which have heretofore been shown and discussed in various publications. In these prior showings, however, the structures have, in general, been arranged to operate with the electrodes at increasingly higher potential from the cathode of the electron gun to the screen, or, at least, without a specific electrode structure whereby a decelerating field is supplied ahead of the color-grid as viewed by the electron beam. A tube designed to operate with the seeker-grid 23 negative to the color-grid would, however, be inoperative if their relative potentials were reversed, since the apertures in the color-grid would be relatively displaced with respect to the color cells on which the various lenses should focus, so that completely wrong colors would be displayed. The placing of the color cells with respect to the apertures corresponding to them has been disclosed fully in prior applications and issued patents and therefore need not be detailed here.

One of the principal values of the type of lens structure here disclosed, which includes a decelerating field on the side of the color-grid away from the screen, is its effectiveness in reducing bombardment of the screen by both secondary and reflected primary electrons. Secondary electrons emitted from the screen do no harm, since they are emitted with low velocities into the field between the color-grid and the screen and return to the screen with the same velocity at which they were emitted, have so little kinetic energy that they are stopped by even a very thin conducting layer 21 of aluminum or other material applied over the phosphor surface. Secondary electrons emitted from the color-grid, however, fall into a different category. With the type of structure shown in Fig. 1, the field between the color-grid and the screen penetrates slightly through the color-grid, so that some lines of force terminate on the side of the grid wires remote from the screen. Any electrons emitted from the grid wires are therefore subjected to acceleration outwardly from the wires and toward the interspace between them, and as a result practically all secondaries eventually strike the screen with a kinetic energy in electron volts equal to the color-grid-to-screen voltage. There is, it is true, a weak non-uniform field due to the positive potential, with respect to the color-grid, on the tube shell, but except where this field is at its maximum, between the frame 17 and the edges of the color-grid, it will not, in general, pick up these secondary electrons. With the construction of the present invention, however, the seeker field strength is greater, and substantially all electrons initially accelerated away from the grid wires fall into it and are therefore removed from the influence of the focusing field, which would return them to the screen and cause color dilution. As it is only that surface of the conductors 15 which is away from the screen which is subject to any material bombardment by the primary beam, the presence of the seeker-grid and the field resulting from it is extremely effective in removing these electrons.

Electrons striking the grid wires at grazing incidence can still be scattered without losing any material portion of their initial energy, but the number of such electrons is small in comparison with the secondary electrons.

High angle scattering by the screen can result in electrons of the reflected primary type which return to the color-grid with sufficient velocity to penetrate the apertures thereof, and such electrons fall into the field between the seeker-grid and the color-grid and are effectively collected by the seeker-grid or the walls of the tube before they can cause any damage to the image. Those reflected electrons which do not have a high enough kinetic energy component normal to the color-grid to penetrate it will, of course, be refracted back to the screen, but the effect of these can be minimized in other ways which are not effective in removing secondary electrons emitted from the color-grid itself. Secondaries from the seeker-grid are at once retarded and accelerated back to or through the latter without ever reaching the accelerating field between the color-grid and the screen.

The present invention therefore effects its two major purposes; it removes distortion of the focusing field at the edge of the screen, results in uniform focusing, and removes a large source of color dilution and contamination. Since various means of giving the fields which form the electron lenses employed have been shown and since these means can be combined in various ways, the invention is not considered to be limited in scope to the typical embodiments shown, all intended limitations being expressed in the claims which follow.

I claim:

1. In combination with a cathode-ray tube for the display of television images in color which includes an electron source for directing a beam of electrons against a target area across which said beam is adapted to be deflected to trace a raster, and a display screen in said target area comprising a light-transmissive base having a coating thereon of a plurality of phosphors each of which is emissive on electron impact of light of a different component color, the colors of said phosphors additively producing white and said phosphors being disposed on said base in a repeating pattern of color cells each of which is in one dimension of the order of magnitude of one elemental area of the television images to be reproduced thereon and each cell comprising sub-areas coated with each of said phosphors: means for establishing a multiplicity of electron lenses each adpted to focus electrons of said beam on a single phosphor sub-area within a corresponding color cell comprising a conductive layer covering said display screen, a first electrode structure mounted adjacent to said display screen and having apertures corresponding in number and position to the respective color cells, a second apertured electrode structure mounted between said first electrode structure and said source and positioned with respect to said first structure to establish therebetween an electric field of decreasing intensity from the centers of said structures outwardly toward the edges thereof, and terminals for applying different relative potentials to said conductive layer and said electrode structures.

2. In combination with a cathode-ray tube for the display of television images in color which includes an electron source for directing a beam of electrons against a target area across which said beam is adapted to be deflected to trace a raster, and a display screen in said target area comprising a light-transmissive base having a coating thereon of a plurality of phosphors each of which is emissive on electron impact of light of a different component color, the colors of said phosphors additively producing white and said phosphors being disposed on said base in a repeating pattern of color cells each of which is in one dimension of the order of magnitude of one elemental area of the television images to be reproduced thereon and each cell comprising sub-areas coated with each of said phosphors: means for establishing a multiplicity of electron lenses each adapted to focus electrons of said beam on a single phosphor sub-area within a corresponding color cell comprising a conductive layer covering said phosphors, and a pair of apertured electrode structures disposed in succession between said electron source and said screen and covering the area of said screen as viewed from said source, and terminals for applying different relative potentials to said conductive layer and said electrode structures, said electrode structures being so disposed with respect to said screen that an electric field established between said structures decreases in intensity from the center outwardly toward the edges thereof and an electric field established between said conductive layer and the electrode structure nearer thereto increases in intensity from the center outward, the apertures in said last-mentioned electrode structure corresponding in number and position to said color cells so that each aperture defines an electron lens focusing on a corresponding color cell.

3. The combination as defined in claim 2 wherein the electrode structure more remote from said structure comprises a grid of elongated linear conductors disposed in a cylindrical surface which is concave as viewed from said electron source.

4. In combination with a cathode-ray tube for the display of television images in color which includes an electron source for directing a beam of electrons against a target area across which said beam is adapted to be deflected to trace a raster, and a display screen in said target area comprising a light-transmissive base having a coating thereon of a plurality of phosphors each of which is emissive on electron impact of light of a different component color, the colors of said phosphors additively producing white and said phosphors being disposed on said base in a repeating pattern of color cells each of which comprises a group of strips including a strip of each of said phosphors extending across said screen, the width of the group of strips being of the order of magnitude of one elemental area of the image to be reproduced; means for establishing a multiplicity of electron lenses each adapted to focus electrons of said beam on a selected phosphor strip within a corresponding color cell comprising a conductive layer covering the phosphors on said screen, a color-grid of elongated linear conductors mounted adjacent to said screen with the conductors substantially parallel with the phosphor strips of said color cells and the interspaces between adjacent conductors of said grid positioned to form the apertures of electron lenses each of which is focused on a corresponding color cell, and a second grid of substantially parallel elongated linear conductors mounted between said color grid and said source the conductors of said second grid extending in a direction transverse to that of the conductors of said color grid, the conductors of at least one of said grids being disposed in a cylindrical surface which is convex toward the other of said grids.

5. The combination as defined in claim 4 wherein the conductors of each of said grids are disposed in cylindrical surfaces which are convex toward each other.

6. In combination with a cathode-ray tube for the display of television images in color which includes an electron source for directing a beam of electrons against a target area across which said beam is adapted to be deflected to trace a raster, and a display screen in said target area comprising a light-transmissive base having a coating thereon of a plurality of phosphors each of which is emissive on electron impact of light of a different component color, the colors of said phosphors additively producing white and said phosphors being disposed on said base in a repeating pattern of color cells each of which comprises a group of strips including a strip of each of said phosphors extending across said screen, the width of the group of strips being of the order of magnitude of one elemental area of the image to be reproduced: means for establishing a multiplicity of electron lenses each adapted to focus electrons of said beam on a selected phosphor strip within a corresponding color cell comprising a conductive layer covering the phosphors on said screen, a color-grid of elongated linear conductors mounted adjacent to said screen with the conductors substantially parallel with the phosphor strips of said color cells and the interspaces between adjacent conductors of said grid positioned to form the apertures of electron lenses each of which is focused on a corresponding color cell and a second grid of substantially parallel elongated linear conductors mounted between said color grid and said source the conductors of said second grid extending in a direction transverse to that of the conductors of said color grid, the conductors at the edges of said color grid being positioned closer to said screen than those at the center thereof, and the conductors at the edges of said second grid being more distant from said color grid than those at the center thereof.

References Cited in the file of this patent

UNITED STATES PATENTS 2,669,675 Lawrence ---------------- Feb. 16, 1954
2,728,024 Ramberg ---------------- Dec. 20, 1955